April 29, 1947. J. D. GIBSON 2,419,558
RECOVERY OF HYDROGEN FLUORIDE CATALYST
Filed Aug. 23, 1943
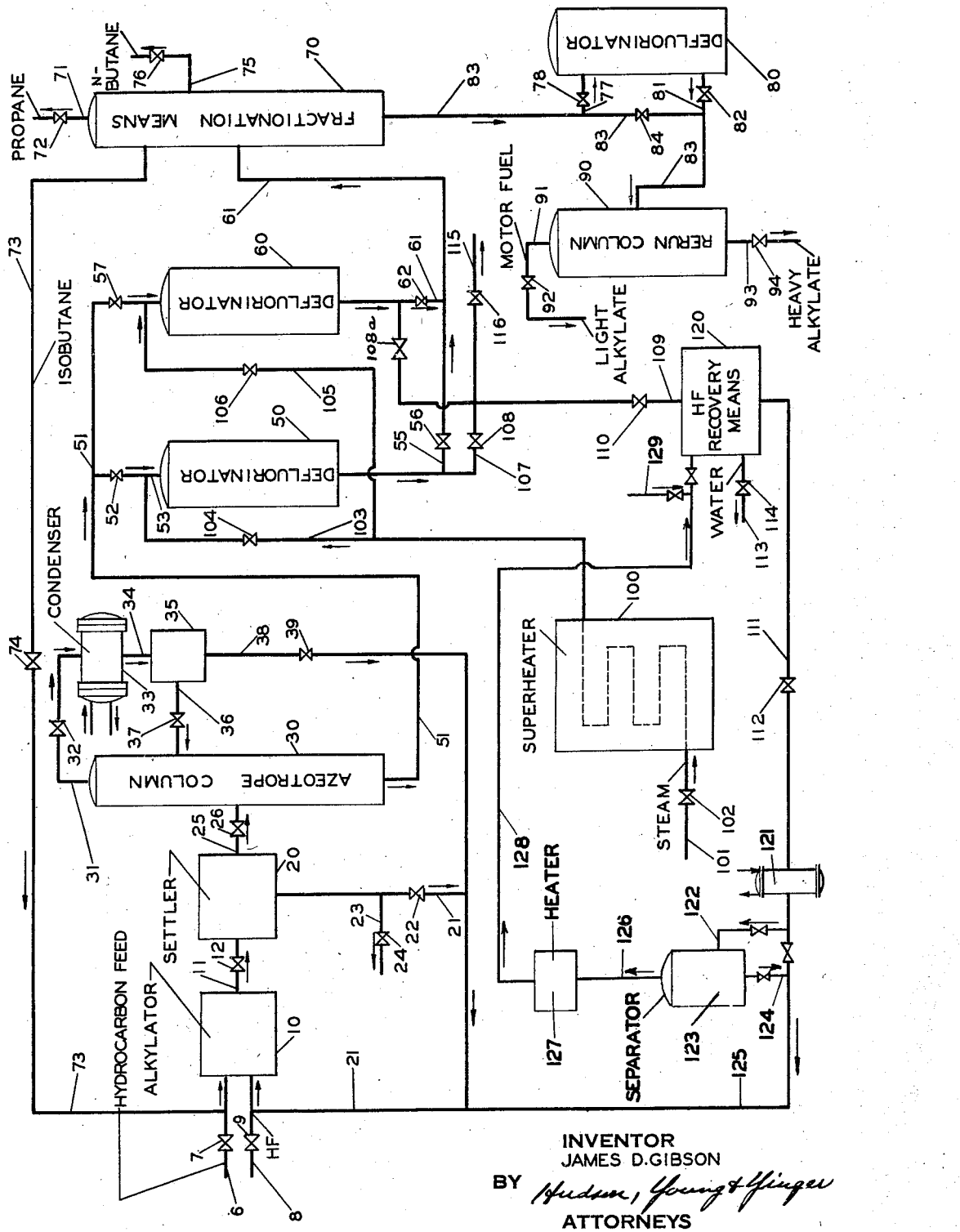
INVENTOR
JAMES D. GIBSON
BY Hudson, Young & Ginger
ATTORNEYS Patented Apr. 29, 1947

2,419,558

UNITED STATES PATENT OFFICE 2,419,558

RECOVERY OF HYDROGEN FLUORIDE CATALYST

James D. Gibson, Bartlesville, Okla., assignor to Phillips Petroleum Company, a corporation of Delaware Application August 23, 1943, Serial No. 499,705

6 Claims. (Cl. 23—153)

This invention relates to the regeneration of defluorination agents or catalysts. In a more particular embodiment it relates to the regeneration of contact material spent in removing organically combined fluorine from hydrocarbon materials obtained in processes utilizing fluorine compounds. In another embodiment it relates to the recovery of fluorine, as hydrofluoric acid, from the defluorination agent.

In the manufacture of hydrocarbons, or hydrocarbon fractions, by processes in which fluorine-containing catalysts are used, small proportions of organic fluorine-containing by-products are formed. These processes may involve various reactions, among which are polymerization, isomerization and alkylation of relatively low-boiling hydrocarbons to produce motor-fuel hydrocarbons, that are effected in the presence of catalysts comprising one or more of such fluorine compounds as hydrofluoric acid, boron trifluoride, and the like. Although the exact nature or composition of these organic fluorine-containing by-products has not been definitely established, they are believed to be predominantly alkyl and/or aryl fluorides. They are not completely removed by washing the hydrocarbon fractions with alkaline solutions. They tend to decompose at elevated temperatures, such as those employed in fractional distillation of the hydrocarbons, thereby forming hydrofluoric acid, which is corrosive, especially in the presence of moisture. In gaseous hydrocarbon fractions they may thus cause corrosion of handling equipment; in liquid, and especially motor-fuel, hydrocarbon fractions, they are obviously undesirable for similar reasons.

The fluorine in these by-products may be removed from hydrocarbon materials by contacting at an elevated temperature between approximately 100° F. and approximately 600° F. with one or more solid porous defluorination agents, such as granular metal oxide contact materials having catalytic hydrogenation and/or dehydrogenation properties, as is disclosed and claimed in Frey 2,347,945, filed June 16, 1941, issued May 2, 1944. Among suitable materials are alumina gel, Activated Alumina, dehydrated bauxite, chromium oxide, and mixtures of alumina and chromium oxide, zirconia, calcium oxide, magnesium oxide, etc. Although defluorination by these materials is highly effective, the fluorine thus removed represents an undesirable consumption of the original fluorine-containing catalyst; consequently, the recovery of this fluorine in a useful form is desirable. Furthermore, since the useful life of a defluorination agent is limited, regeneration of the defluorination agent is also desirable.

An object of this invention is to regenerate spent porous contact materials used for the removal of organic fluorine from hydrocarbon materials.

Another object of this invention is to recover fluorine as substantially anhydrous hydrofluoric acid from a porous contact material used to defluorinate a hydrocarbon material.

A further object of this invention is to regenerate defluorination agents.

Another object of this invention is to regenerate bauxite used as a defluorinating agent.

Other objects and advantages will be apparent from the accompanying description and discussion.

In accordance with this invention, a spent porous defluorination agent is regenerated by treatment with superheated steam, whereby the fluorine is removed as hydrofluoric acid, which may be concentrated to the anhydrous condition.

An understanding of the invention may be facilitated by reference to the accompanying drawing, which in a schematic flow-diagram shows a mode of practicing the invention. For the sake of concreteness, this flow-diagram shows a mode of practicing the invention in connection with a hydrofluoric acid alkylation system.

A hydrocarbon feed enters the system through one or more inlets represented by inlet 6 controlled by valve 7 and is passed to alkylator 10. This feed comprises: an alkylatable hydrocarbon, usually an isoparaffin, such as isobutane; an alkylating agent, usually an olefin, such as one or more of the butenes; and usually some incidentally present diluents, such as normal butane and propane. The exact composition of the feed may vary within broad limits; a generally satisfactory mol ratio of alkylatable hydrocarbon to alkylating agent in the feed is from 4:1 to 10:1, although a mol ratio as high as 100:1 may be maintained if desired. Concentrated hydrofluoric acid enters the system through inlet 8 controlled by valve 9 and is passed to alkylator 10, in which the acid and the hydrocarbon feed are intimately mixed by any suitable agitation device. Operating conditions in alkylator 10, as for example for alkylating isobutane with butylenes, are a temperature of 30 to 150° F., a pressure sufficient to maintain all components in liquid phase, a contact time or time of residence in the alkylator of about 1 to 30 or more minutes, and a volume ratio of acid to hydrocarbon from 2:1 to 1:2; however, conditions outside of these ranges may be used.

The effluent mixture from alkylator 10 is passed through conduit 11 controlled by valve 12 to settler 20, in which the mixture is separated, as by gravity and/or centrifugation, aided, if desired, by cooling, into a lighter or hydrocarbon phase and a heavier or acid phase. The hydrofluoric acid phase may be recycled through conduit 21 controlled by valve 22 to alkylator 10;

usually, however, a part of this phase is withdrawn, as through outlet 23 controlled by valve 24, for purification, by means not shown, before being returned to alkylator 10. The hydrocarbon phase is passed through conduit 25 controlled by valve 26 to azeotrope column 30 in which it is separated by fractional distillation into two fractions.

The overhead fraction from azeotrope column 30 is a low-boiling or azeotropic mixture of hydrofluoric acid and low-boiling paraffin hydrocarbons such as propane and isobutane. This fraction is passed through conduit 31 controlled by valve 32 to condenser 33. The liquid effluent from condenser 33 is passed through conduit 34 to settler 35, in which a heavier or hydrofluoric acid phase is separated from a lighter or hydrocarbon phase. The hydrocarbon phase is returned as reflux to azetrope column 30 through conduit 36 controlled by valve 37, and the acid phase is recycled through conduit 38 controlled by valve 39 to alkylator 10.

The kettle fraction from azeotrope column 30, which is substantially free from hydrofluoric acid but contains a small proportion of organically combined fluorine, is passed through conduit 51 controlled by valve 57 to defluorinator 60. In defluorinator 60 it is contacted with a solid porous metal oxide contact material capable of removing organically combined fluorine from hydrocarbons, such as alumina-gel, Activated Alumina, dehydrated bauxite, chromium oxide, or a mixture of alumina and chromium oxide, etc., as previously discussed. Although the exact mechanism of the removal of organically combined fluorine is not fully understood, it may be at least partially represented by the following reaction scheme:

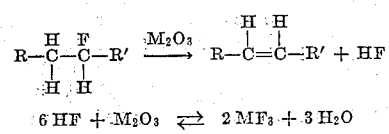

where R and R' are alkyl radicals or hydrogen and M is a trivalent metal.

For the sake of concreteness of illustration, the contact material may be considered to be dehydrated bauxite, which is preferred because of its general availability at low cost. The hydrocarbon material may be in either the liquid or the gaseous state; as the materials involved in this process are easily maintained in the liquid phase under the preferred operating conditions, liquid-phase treatment is preferable. A suitable temperature for defluorination is usually in the range of approximately 150 to 350° F. A generally suitable space velocity is 1 to 2 liquid volumes per hour, although the optimum space velocity depends upon the specific contact material used, the temperature, the fluorine content of the material to be treated, and the degree of defluorination desired. The optimum combination of defluorination conditions for any specific case may be experimentally determined by anyone skilled in the art.

The effluent from defluorinator 60 is passed through conduit 61 controlled by valve 62 to fractionating means 70, which usually comprises a system of two or more fractionating columns. In this means, the hydrocarbon material is separated into some or all of the following fractions: (1) a minor fraction comprising chiefly substantially fluorine-free propane, which is withdrawn from the system through outlet 71 controlled by valve 72; (2) a major fraction comprising principally substantially fluorine-free isobutane, which is recycled through conduit 73 controlled by valve 74 to alkylator 10; (3) a fraction comprising mainly substantially fluorine-free normal butane, which is withdrawn from the system, through outlet 75 controlled by valve 76; and (4) a fraction boiling above butane, which ordinarily is passed through conduit 83 controlled by valve 84 to rerun column 90, but which may be passed through conduit 77 controlled by valve 78 to defluorinator 80 for removal of any residual objectionable proportion of organic fluorine under conditions similar to those described for defluorinator 60, except that the temperature may have to be somewhat higher, and then through conduit 81 controlled by valve 82 to conduit 83 and rerun column 90.

From rerun column 90 a mixture of hydrocarbons boiling in the motor-fuel range is removed as an overhead fraction through outlet 91 controlled by valve 92. A small relatively high-boiling fraction of hydrocarbons boiling above the motor-fuel range is withdrawn from column 90 through outlet 93 controlled by valve 94.

The present invention is primarily concerned with regeneration of the defluorination agent or contact material and with recovery as hydrofluoric acid of the absorbed fluorine. When the contact material in defluorinator 60 has become spent to such a degree that regeneration is considered desirable, as, for example, when the bauxite contains 30 to 40 per cent of its own weight of fluorine, the hydrocarbon stream from azeotrope column 30 is diverted through defluorinator 50 by opening of valves 52 and 56 in conduits 53 and 55, respectively, and closing of valves 57 and 62 in conduits 51 and 61, respectively. Defluorinator 50 is similar in construction, content, and operation to defluorinator 60, although a different contact material may be used if desired. For regeneration of the defluorination agent, steam enters the system through inlet 101 controlled by valve 102. It is passed through superheater 100, which is any suitable apparatus for raising the temperature of the steam to the generally satisfactory temperature range of approximately 600 to 1000° F., preferably 850 to 950° F. The superheated steam is passed through conduit 105 controlled by valve 106 to defluorinator 60, where it is passed through the spent bauxite at a rate equivalent to 0.1 to 5 liquid volumes of water per volume of defluorination agent per hour, depending on the specific contact material, the temperature, the fluorine content of the contact material, and the desired degree of regeneration. The optimum operating conditions for any specific application of the invention may be experimentally determined by anyone skilled in the art, in the light of the disclosure and discussion presented herein.

The regeneration effluent from defluorinator 60 is passed through conduit 109 and valve 108A. If desired it may be withdrawn through outlet 115 controlled by valve 116, but it is preferably passed to hydrofluoric acid recovery means 120 through conduit 109 controlled by valve 110. Hydrofluoric acid recovery means 120 may comprise any system of apparatus suitable for recovering substantially anhydrous hydrofluoric acid from mixtures with water. The recovery may be effected in various ways, as by multiple fractional distillation at different pressures, electrolysis, or the like, but it is usually preferably effected through formation of a complex or compound with an agent of the type of high-boiling ethers, nitrogen bases, metal salts that form acid fluorides, etc., removing the acid-depleted water, and reliberating the hydrofluoric acid in substantially anhydrous form, preferably by heat. A presently preferred method of operation is to contact the vaporous mixture of steam and hydrogen fluoride with a metal fluoride that is capable of forming a complex acid salt with hydrogen fluoride, especially the fluorides of the alkali and the alkali earth metals. There is also some indication that other fluorides, such as aluminum fluoride, will also form such complex salts. These metal fluorides are preferably used as a large mass of granular salt. Although they may be used alone, it is often preferable to have them deposited upon a porous supporting material such as charcoal, bauxite, alumina gel and the like, preferably of a non-siliceous character. This contacting should be carried out under temperature and pressure conditions such that a liquid aqueous phase is not present and such that the partial pressure of the hydrogen fluoride is substantially greater in the vapor mixture than is the partial pressure of hydrogen fluoride in the complex salts being formed. It is preferred, however, that the temperatures not exceed about 350 to 400° F.; when working at a pressure at about atmospheric a temperature of about 240° F. has been found quite satisfactory. When the mass of metal salt is sufficiently saturated with hydrogen fluoride so that efficient removal of hydrogen fluoride from the vaporous mixture is no longer obtained another mass of metal fluoride may be put into operation and hydrogen fluoride recovered in a concentrated or anhydrous form from the saturated mass. This may be effected simply by heating the mass under a reduced pressure and cooling and condensing the effluent vapors. In some instances it may be desirable to pass through the mass during this heating an inert gas such as air, nitrogen, or a low-boiling hydrocarbon and I have obtained satisfactory operation by using butane as such a gas. Substantially acid-free steam or water is withdrawn through outlet 113 controlled by valve 114, and substantially anhydrous hydrofluoric acid is recycled to alkylator 10 through conduit 111 controlled by valve 112.

In a case where a low-boiling hydrocarbon is passed through recovery means 120 for removal and recovery of hydrogen fluoride from the metal fluoride by heating, the resulting effluent passes out line 111 and through valve 112 to condenser 121. From condenser 121, where the effluent is liquefied, a liquid mixture is passed to separator 123 by line 122. In separator 123 the liquid mixture separates into two phases, a liquid hydrocarbon phase and a heavier liquid hydrogen fluoride phase. The hydrocarbon phase is withdrawn from separator 123 through line 126, and the liquid hydrogen fluoride phase is withdrawn through line 124 and recycled by lines 125 and 21 to the alkylator 10. The liquid hydrocarbon phase which is removed from separator 123 through line 126 is passed to a heater 127. The hydrocarbon phase is vaporized in heater 127 and recycled to recovery means 120 by line 128. Make-up hydrocarbon may be added through line 129, when necessary. The hydrogen fluoride removed from separator 123 by line 124 is substantially free from water and the hydrocarbon. To remove hydrogen fluoride dissolved in the liquid hydrocarbon phase or to recover the hydrogen fluoride when the condensed effluent from heating zone 120 contains an amount of hydrogen fluoride below its solubility in the hydrocarbon comprising the effluent, the liquefied hydrocarbon may be treated in conventional manner familiar to those skilled in the art for recovery of the dissolved hydrogen fluoride. One method for recovery of dissolved hydrogen fluoride in a liquid hydrocarbon is exemplified by the present invention in which the dissolved hydrogen fluoride is removed from the hydrocarbon phase from settler 20 by distilling the hydrocarbon phase in azeotrope column 30 of the drawing. For more detailed information regarding the recovery of dissolved hydrogen fluoride from a liquid hydrocarbon fraction, Patent No. 2,320,629 of Matuszak, issued June 1, 1943, may be consulted.

When no inert gas, such as a low-boiling hydrocarbon, is passed through recovery means 120 the hydrogen fluoride removed therefrom is passed directly through lines 111, condenser 121, and lines 125 and 21 to alkylator 10 without passing through separator 123.

The contact material in defluorinators 50 and 60 is regenerated in similar manner when it has become spent to such a degree that regeneration is desirable. In regenerating the material present in defluorinator 50, the hydrocarbon stream from column 30 is diverted and again passed through defluorinator 60, and superheated steam is passed through conduit 103 controlled by valve 104. As in the previously described regeneration of defluorinator 60, the regeneration effluent from defluorinator 50 is passed through conduit 107 and valve 108. If desired, it may be withdrawn through outlet 115, but preferably is passed to the recovery means 120 through conduit 109.

Many other arrangements of apparatus suitable for practicing the invention may be devised by anyone skilled in the art without departing from the scope and spirit of the invention.

An understanding of some aspects of the invention may be further aided by the following examples:

*Example I*

The hydrocarbon effluent from the azeotrope column of a continuous hydrofluoric acid alkylation system substantially as indicated in the drawing was passed through dehydrated bauxite for the removal of organically combined fluorine. When the fluorine content of the bauxite reached 31.6 weight per cent, the hydrocarbon stream was stopped.

Superheated steam at different temperatures and space velocities was passed through a portion of the used bauxite to effect regeneration. The following results were obtained:

| Period | Time, hr. | Temp., °F. | Steam, equivalent liquid volume water per vol. bauxite per hour | Fluorine removed as HF, cumulative per cent |
|---|---|---|---|---|
| 1 | 3.0 | 590 | 0.14 | 1.8 |
| 2 | 2.3 | 600 | 0.61 | 12.6 |
| 3 | 2.0 | 605 | 0.5 | 19.5 |
| 4 | 1.8 | 600 | 1.0 | 27.6 |
| 5 | 1.1 | 610 | 0.9 | 35.8 |
| 6 | 3.6 | 600 | 1.2 | 59.2 |
| 7 | 2.6 | 880 | 1.2 | 87.2 |
| 8 | 1.0 | 910 | 0.9 | 90.8 |
| 9 | 1.9 | 940 | 0.74 | 94.3 |
| 10 | 2.3 | 880 | 0.34 | 94.9 |

Substantially complete removal of fluorine was effected. The regenerated bauxite was suitable for further use in defluorination, and the effluent mixture of steam and hydrofluoric acid was separable to yield substantially anhydrous hydrofluoric acid.

Example II

Dehydrated bauxite was used for removal of organic fluorine from a hydrofluoric acid-free paraffinic product of a paraffin conversion process. This bauxite, after such use, contained 31.6 weight per cent fluorine. It was regenerated by superheated steam with the following results:

| Period | Time, hr. | Temp., °F. | Steam, equivalent volume water/vol. bauxite/hr. | Fluorine removed as HF, cumulative per cent |
|---|---|---|---|---|
| 1 | 1 | 890 | 0.33 | 43.9 |
| 2 | 1 | 942 | 0.24 | 76.5 |
| 3 | 1 | 917 | 0.29 | 81.1 |
| 4 | 1 | 880 | 0.71 | 86.5 |
| 5 | 2 | 970 | 0.29 | 87.1 |

The regenerated bauxite was suitable for further use in defluorination of hydrocarbon streams, and the effluent mixture of steam and hydrofluoric acid was separable to yield substantially anhydrous hydrofluoric acid.

Example III

In a system for the continuous hydrofluoric acid alkylation of isobutane with a mixture of butenes, the effluent from the alkylator is passed to a settler, in which, by means of gravity, the effluent is separated into two liquid phases. The heavier or acid phase is recycled to the alkylator and the lighter or hydrocarbon phase is passed to an azeotrope column, in which the dissolved hydrogen fluoride is removed as a low-boiling mixture with isobutane. The kettle fraction, which is composed of substantially hydrogen fluoride-free hydrocarbons and a minor proportion of organic fluorine compounds, is passed through a defluorination chamber containing dehydrated bauxite at a temperature of about 180° F. and a space velocity of about 2.0 liquid volumes per volume of catalyst per hour. After a period of such operation, the bauxite has a fluorine content of approximately 40 weight per cent. The defluorination with this bauxite is discontinued by passing the hydrocarbon stream through another chamber, which contains fresh bauxite. Superheated steam at a temperature of 900° F. is passed through the used bauxite. The effluent steam is cooled to 240° F. and is passed to an absorber in which the steam at approximately atmospheric pressure is contacted with potassium fluoride on an inert support maintained at 240° F. to absorb the hydrofluoric acid formed in the regeneration of the used bauxite. Periodically, the potassium fluoride absorber is cut off from the steam regeneration system to recover the hydrofluoric acid by heating the potassium fluoride complex with butane vapor at 600° F. The effluent vapor stream is condensed by cooling and the lower liquid hydrofluoric acid layer is recycled to the alkylator, and the upper liquid butane is sent to a heater to be vaporized and heated before being returned to the potassium fluoride complex to remove additional hydrofluoric acid. The potassium fluoride absorber is then reused for absorbing more hydrofluoric acid from the regeneration steam. The regenerated bauxite is suitable for reuse for defluorination.

Example IV

In an exploratory experiment, a constant-boiling aqueous solution containing 38 per cent by weight of hydrofluoric acid was vaporized and passed at 347° F. through a bed of charcoal impregnated with 30 per cent of its own weight of potassium fluoride; the effluent contained only 0.1 per cent by weight of hydrofluoric acid. The adsorbed hydrofluoric acid was partly removed by passage of nitrogen through the bed at 617° F., until the effluent nitrogen contained only 0.35 per cent by weight of hydrofluoric acid. Then vaporized 38 per cent hydrofluoric acid was passed through the bed at 257° F.; the effluent contained 0.35 per cent by weight of hydrofluoric acid. Hydrofluoric acid adsorbed in this second adsorption was then removed by passage of nitrogen through the bed at 527° F. Vaporized 38 per cent hydrofluoric acid was again passed through the bed at 257° F., until the bed was saturated and the effluent contained as much hydrofluoric acid as the feed. The bed gave off a large proportion of the adsorbed hydrofluoric acid on being heated to 662° F.; passage of nitrogen through the bed at this temperature desorbed additional hydrofluoric acid, so that the total hydrofluoric acid recovered amounted to 88 per cent by weight of the potassium fluoride in the bed.

The invention may be practiced in many ways other than those specifically described and many modifications within the scope of the invention will be obvious to those skilled in the art, in the light of the present disclosure and discussion, so that the invention should not be unduly restricted by the foregoing specification and examples.

I claim:

1. A process for the recovery of fluorine in the form of hydrofluoric acid from a hydrocarbon material containing said fluorine in the form of an organic fluorine compound, which comprises defluorinating said hydrocarbon material by contact with a porous metal oxide defluorinating agent under such defluorination conditions that said fluorine is removed from said hydrocarbon material and is retained by said defluorinating agent, subsequently removing the fluorine as hydrofluoric acid by treating the defluorinating agent with superheated steam at a temperature above approximately 600° F. to convert retained fluorine to hydrogen fluoride and to effect removal of hydrogen fluoride therefrom, absorbing hydrogen fluoride from the resulting vaporous mixture with a fluoride of a metal of the group consisting of the alkali and the alkali earth metals at a temperature not greater than about 400° F. and under conditions of temperature and pressure such that a liquid aqueous phase is not present and the partial pressure of the hydrogen fluoride is substantially greater in said resulting vaporous mixture than is the partial pressure of hydrogen fluoride in said metal fluoride, and subsequently desorbing hydrogen fluoride from said metal fluoride.

2. A process for the recovery of fluorine in the form of hydrofluoric acid from a hydrocarbon material containing said fluorine in the form of organic fluorine compounds, which comprises defluorinating said hydrocarbon material by contact with a porous metal oxide defluorinating agent under such defluorination conditions that said fluorine is removed from said hydrocarbon material and is retained by said defluorinating agent, subsequently removing the fluorine as hydrofluoric acid by treating the defluorinating agent with superheated steam at a temperature above approximately 600° F. to convert retained fluorine to hydrogen fluoride and to effect removal of hydrogen fluoride therefrom, absorbing hydrogen fluoride from the resulting vaporous mixture with a fluoride of a metal of the group consisting of the alkali and alkali earth metals at a temperature of approximately 240° F. and at a pressure of approximately atmospheric, and subsequently desorbing hydrogen fluoride from said metal fluoride with a stream of butane at approximately 600° F.

3. A process for the recovery of fluorine in the form of hydrofluoric acid from a hydrocarbon material containing said fluorine in the form of organic fluorine compounds, which comprises defluorinating said hydrocarbon material by contact with a porous metal oxide defluorinating agent under such defluorination conditions that said fluorine is removed from said hydrocarbon material and is retained by said defluorinating agent, subsequently removing the fluorine as hydrofluoric acid by treating the defluorinating agent with superheated steam at a temperature above approximately 600° F. to convert retained fluorine to hydrogen fluoride and to effect removal of hydrogen fluoride therefrom, absorbing hydrogen fluoride from the resulting vaporous mixture with potassium fluoride at a temperature of approximately 240° F. and at a pressure of approximately atmospheric, and subsequently desorbing hydrogen fluoride from said potassium fluoride with a stream of butane at approximately 600° F.

4. The process for recovering hydrogen fluoride in a concentrated form from aqueous hydrofluoric acid, which comprises absorbing hydrogen fluoride from said aqueous hydrofluoric acid with a fluoride of a metal of the group consisting of the alkali and the alkali earth metals at a temperature not greater than about 400° F. and under conditions of temperature and pressure such that a liquid aqueous phase is not present and the partial pressure of the hydrogen fluoride is substantially greater in said resulting vaporous mixture than is the partial pressure of hydrogen fluoride in said metal fluoride, subsequently passing a vaporous low-boiling paraffinic hydrocarbon over the resulting fluorine-enriched metal fluoride at a sufficiently elevated temperature and low pressure to desorb hydrogen fluoride, cooling and condensing the resulting vaporous hydrocarbon-hydrogen fluoride mixture to form a liquid hydrocarbon-rich phase and a liquid hydrogen fluoride-rich phase, and recovering liquid concentrated hydrogen fluoride.

5. The process of claim 4 in which said low-boiling paraffinic hydrocarbon is butane.

6. The process for recovering hydrogen fluoride in a concentrated form from aqueous hydrofluoric acid, which comprises absorbing hydrogen fluoride from said aqueous hydrofluoric acid with a fluoride of a metal of the group consisting of the alkali and alkali earth metals at a temperature of approximately 240° F. and at a pressure of approximately atmospheric, subsequently desorbing hydrogen fluoride from said metal fluoride with a stream of butane at approximately 600° F., cooling and condensing the resulting vaporous butane-hydrogen fluoride mixture to form a liquid butane-rich phase and a liquid hydrogen fluoride-rich phase, and recovering liquid concentrated hydrogen fluoride.

JAMES D. GIBSON.

REFERENCES CITED

The following references are of record in the file of this patent:

UNITED STATES PATENTS

| Number | Name | Date |
| --- | --- | --- |
| 2,267,730 | Grosse | Dec. 30, 1941 |
| 2,333,649 | Grosse et al. | Nov. 9, 1943 |
| 1,869,781 | Shiffler | Aug. 2, 1932 |
| 2,300,235 | Pines | Oct. 27, 1942 |
| 2,320,629 | Matuszak | June 1, 1943 |
| 2,322,800 | Frey | June 29, 1943 |
| 2,333,649 | Grosse | Nov. 9, 1943 |
| 2,347,945 | Frey | May 2, 1944 |
| 2,347,317 | Gibson | April 25, 1944 |
| 2,341,567 | Moriarty | Feb. 15, 1944 |

OTHER REFERENCES

Ikebe et al., Chemical Abstracts, vol. 26, page 1405 (1932). (Copy in Sci. Lib.)

Tananaev, Chemical Abstracts, vol. 32, page 4867 (1938). (Copy in Scientific Library.)

Tech. Sect. Nat. Pet. News, June 2, 1943, vol. 35, No. 22, pages R243, R244, 260-683.4.